United States Patent [19]

Beller

[11] Patent Number: 5,042,451
[45] Date of Patent: Aug. 27, 1991

[54] BARBEQUE GRILL WITH CLEAN OUT DOOR AND ADJUSTABLE GRILL

[75] Inventor: Frank W. Beller, Aurora, Ill.

[73] Assignee: Flame-King, Inc., Aurora, Ill.

[21] Appl. No.: 635,741

[22] Filed: Dec. 28, 1990

[51] Int. Cl.⁵ ............................................. F24B 3/00
[52] U.S. Cl. ................................ 126/25 A; 126/25 R
[58] Field of Search ................. 126/25 R, 25 A, 41 R

[56] References Cited

U.S. PATENT DOCUMENTS

| | | | |
|---|---|---|---|
| 3,027,887 | 4/1962 | Krohncke | 126/25 R |
| 4,592,335 | 6/1986 | Beller | 126/25 R |
| 4,788,706 | 12/1988 | Starks | 126/25 R |
| 2,482,0678 | 9/4194 | Larson | 126/25 R |

Primary Examiner—Carroll B. Dority
Attorney, Agent, or Firm—Lee, Mann, Smith, McWilliams & Sweeney

[57] ABSTRACT

A barbeque grill having a closable hood and a firebox having opposite ends wherein one of the ends is a pivotable clean out door, which allows access to the interior of the firebox while the hood is closed. An adjustable grill assembly is provided with grill support plates residing interiorly of the barbeque grill and spaced independently from the ends of the firebox. The hood includes cut out gaps for handlebars of the grill whereby the grill may be adjusted on the grill support plates while the hood is closed and independently of the clean out door.

21 Claims, 2 Drawing Sheets

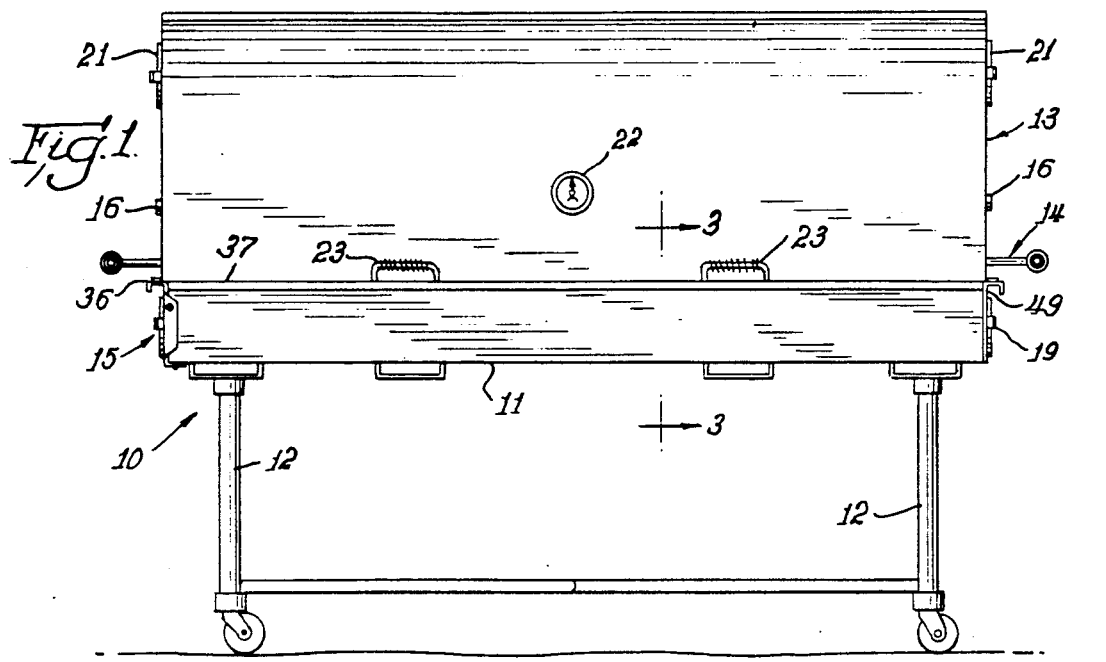
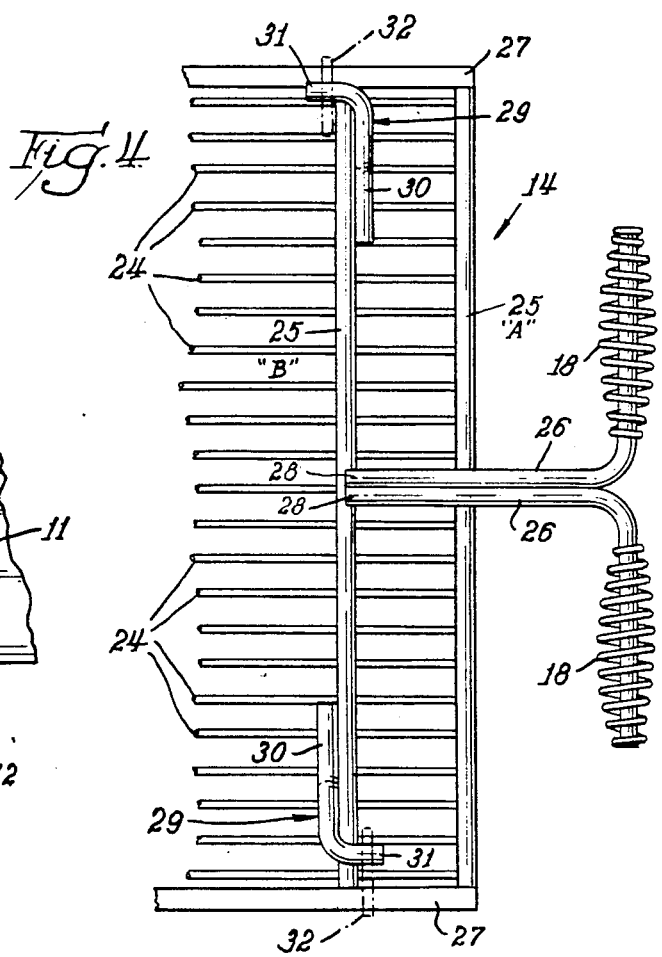
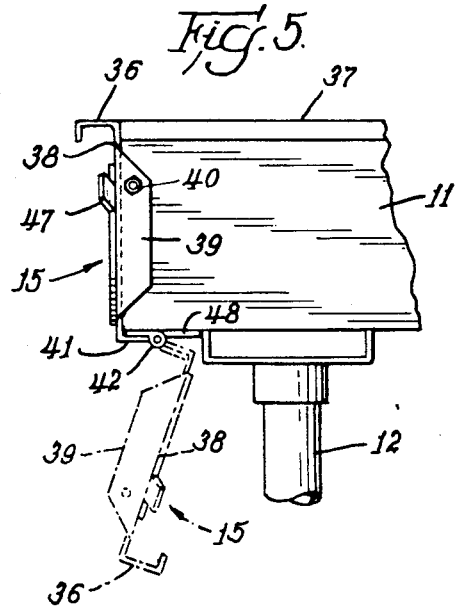

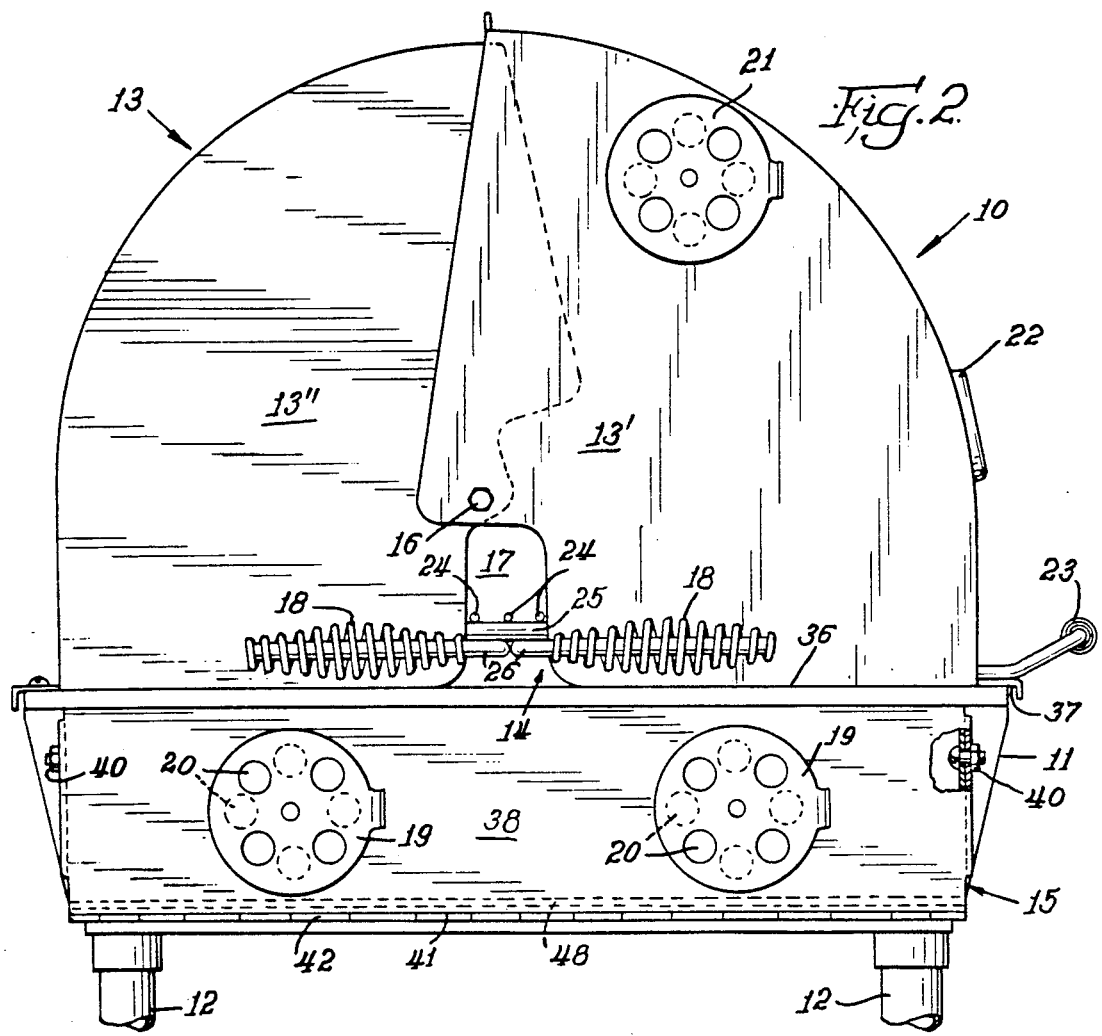
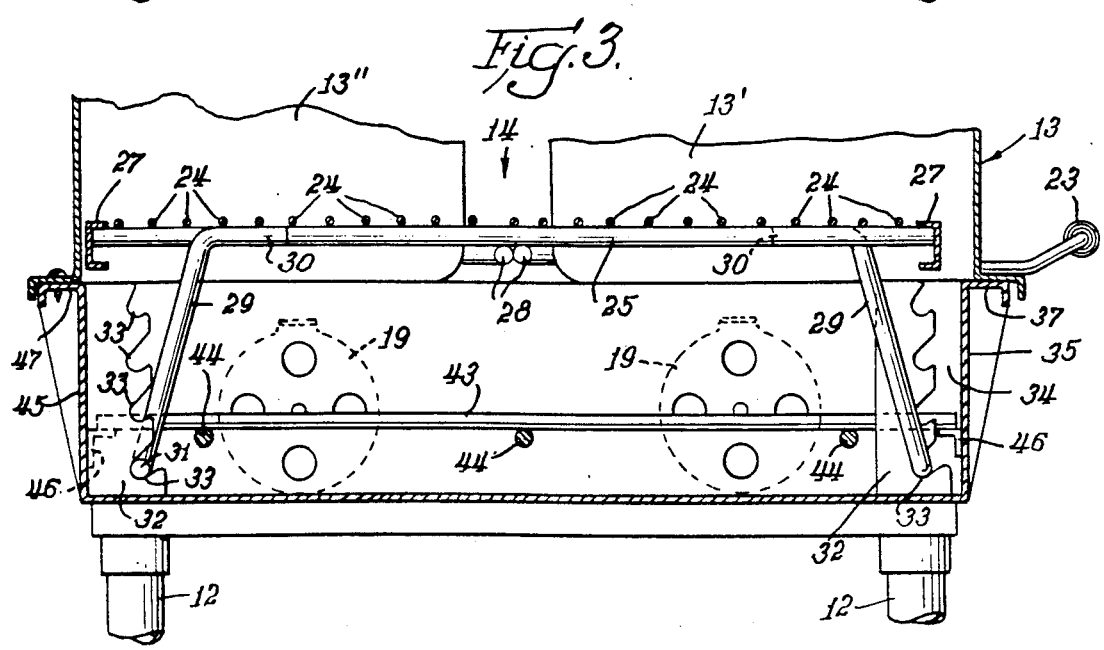

BARBEQUE GRILL WITH CLEAN OUT DOOR AND ADJUSTABLE GRILL

BACKGROUND OF THE INVENTION

The invention is related to barbeque grills. More particularly the invention is directed to large outdoor grills of the type which optionally may have a hood covering over a firebox containing a grill with a heat source below. More specifically, the invention is directed to providing a clean out door for such large outdoor barbeque grills and a cooperative grill assembly.

Large outdoor cooking devices, particularly those used commercially by caterers, private clubs and organizations sponsoring picnics and the like, utilize a heat source typically charcoal, wood, or mesquite that is burned on a fire grate supported within a firebox, or may use gas burners. This type of device is generally shown in my U.S. Pat. No. 4,592,335. The construction of the firebox in that device, and in fireboxes of other prior art devices incorporates a heavy gauge metal rectangular box formed to have a bottom wall, two end walls and two longer side walls. Once these large scale barbeque devices are in use at picnics, social gatherings and the like, constant and high quantity barbequing usually is required in order to prepare food for many people. As the barbequing continues and new charcoal, mesquite, wood, or the like, is added atop the fire grate, the ashes and food particle drippings collect on the bottom of the fire box and are cleaned out by lifting the grill and fire grate to scoop out this waste material. This usually requires disturbing food atop the grill and the heat source located on the fire grate.

It would accordingly be desirable to provide for cleaning out the bottom of the firebox without interrupting barbequing procedures.

Other clean out procedures have been utilized such as in the closable disk vents provided in WEBER-brand barbeque kettles that allow for the ash and any carbonized food particles to be pushed through disk openings onto a collecting trough supported by the kettle legs in a known manner. This procedure also requires a clean out from above the grate by the cook's hands and a disturbance of the cooking food and burning coals on the fire grate. Therefore, in order to clean out by means of this type of bottom clean out, typically one must wait until the food has been prepared and the coals have cooled in order that the user may reach into the kettle to clean out the kettle bottom and the fire grate.

It is therefore an object of the invention to provide for a clean out means that may be operated during cooking, without disturbing food, or coals.

It is accordingly a goal of the invention to provide such a clean out door that may be used to clean out the bottom of a fire box while the cooking procedures with combusting coals continue.

It is further a goal of the invention to provide for a clean out from the end of a barbeque grill that is pivotally arranged on the firebox having continuous contact maintained between the clean out and the firebox in order to prevent heated coals, ashes, food droppings, etc., from falling out of the firebox when closed.

Outdoor barbeque devices usually provide for nickel plated grills upon which food items such as bratwurst, hotdogs, hamburgers, shish-ka-bobs, vegetables and the like, are placed. Handles are typically provided to extend outwardly of the firebox so that the entire grill may be safely lifted from the grill. As in my issued U.S. Pat. No. 4,592,335, a slant adjustable grill utilizing grill support panels extending upwardly from the firebox end walls is provided for adjustment of the grill handles thereon and wherein the hood is provided with pairs of apertures for the arms of the grill handles to extend outwardly. Although that invention is very useful, there has also been a need to provide for an adjustment for a grill that does not require grill support panels associating with the firebox end walls for support of the handles above the firebox.

It has also become a goal to eliminate dual openings at both ends of the hood that provide for the outward extension of two arms of a handle, each of which engage separate support panels as in my said Pat. No. 4,592,335. In this regard, it would be desirable to provide only a single grill arm extending outwardly through just one aperture at the end of a hood and wherein the grill support members may consist of leg means engageable with multi-position grill supports residing substantially entirely within and not above the firebox. It is also therefore a goal to provide such grill adjustment means that further eliminates attaching grill support panel means, and the like, to firebox end walls so that a closable clean out door may be provided whereby the grill may be maintained in its position without the need to disengage it from grill supports to clean out the firebox or grate.

It is also an object of the invention to provide for an adjustable grill assembly having grill supports entirely within the firebox whereby the grill adjustable assembly is cooperative with clean out end walls, or doors, that are independently operable so that clean out procedures or the adjustment of the grill are independent and may be undertaken simultaneously or separately.

It is further a concomitant goal of the invention to provide for the combination of a clean out for the firebox of a barbeque grill and an adjustable grill that is adjustable not only vertically, but also may be slant adjustable to dispose the opposite edges of the grill higher or lower relative to the other for gradient heating of food stuffs thereon.

It is also an allied goal of the invention to provide for grill adjustment from the exterior while the hood is closed.

It is a related goal of the invention to provide for the adjustment of a grill in combination with a clean out door for a barbeque grill of the type having a two-shell "bread-box" type hood, wherein front and rear shell sections are relatively pivotal to one another and cooperatively provide end slots for the arms of the grill. The slots would thereby permit the adjustment of the grill when the "bread-box" hood is closed, and at the same time offers the capability of pivoting open either the front or back hood shell without interference to the grill position or operation of the clean out means.

SUMMARY OF THE INVENTION

The invention may be summarized as providing for cleaning out the firebox of a barbeque grill without disturbing either the food being cooked or the combusting heat source, while allowing for a grill to be both vertically and slantwise adjustable independent of the clean out means. The invention is also useful for fireboxes covered by pivotable hood closures, and particularly those that are of the bread-box, twin shell pivoting type. The invention provides for at least one end wall of the firebox of a barbeque grill to be pivotally affixed to the bottom of the firebox and mechanically fastenable in a locked position. The pivotal door may be opened during cooking procedures to clean out ash, carbonized food particles, grease and the like, that have fallen to the firebox bottom wall. The end wall is continuously hingedly joined to the bottom wall so that when closed there are no seams or gaps whereby to block unwanted convection currents and prevent the dropping of waste and charred materials outwardly of the firebox.

In order to allow for the grill to be adjustable by means of notched grill support plates, the invention involves the relocation of grill support plates, preferably of the type having upwardly slanted notches, to be at the firebox long front and back walls, and secured to the bottom wall of the firebox, in order to be independent of the firebox end walls. Thereby, an end wall may comprise a movable clean out door and the device allows for the horizontal or slant adjustment of the grill on the support plates independently of the clean out.

A grill is therefore provided in combination with grill support plates firebox-inwardly of the end walls. The grill having front and rearwardly slanted depending legs terminating in transversely bent projections at each corner of the grill. The transversely bent projections are directed in opposite directions at each end of the grill for purposes of preventing horizontal shifting of the grill.

The clean out door may be optionally provided with rotatable disk type draft dampers of a known kind. Preferably, the end clean out door includes inwardly directed flanges for overlying the long walls of the firebox, and including corresponding apertures through both for the connection to the long walls by easily removable mechanical fasteners in order to secure the clean out door in place. A clean out door may be provided at both ends of the firebox.

The adjustable grill also has outwardly extending handles extending outwardly of the firebox through a cut out gap of the grill hood, whereby the grill height and inclination may be adjusted without opening the hood.

BRIEF DESCRIPTION OF THE DRAWINGS

FIG. 1 is an elevational view of a barbeque grill showing a hood closed over the firebox, a firebox supported on wheeled legs, and wherein the adjustable grill and clean out door of the invention are provided;

FIG. 2 is an end view of the firebox and closed hood of the barbeque grill as in FIG. 1 showing the handles of the adjustable grill extending outwardly of the hood and a clean out door having disk shaped draft dampers in accordance with the invention;

FIG. 3 is a vertical sectional view taken along line 3—3 of FIG. 1 looking in the direction of the arrows illustrating the arrangement of the adjustable grill, notched grill support plates and depending support legs supported within the firebox, a fire grate for charcoal and the like and a fixed end wall at the opposite end also having draft dampers;

FIG. 4 is a partial plan underside view generally at one end of the adjustable grill showing the arrangement of a handle and depending support legs with transversely directed projecting ends for support plate engagement of the grill, wherein the projecting ends of the support legs at each end of the grill are directed in opposite directions in order to horizontally restrain the from shifting on the support panels; and, FIG. 5 is a partial elevational view of the end of the firebox and clean out door of the barbeque grill of FIG. 1 shown in solid lines in the closed position and in phantom lines having the locking means removed and the door pivoted downwardly to grant access to the interior of the firebox.

DETAILED DESCRIPTION OF THE INVENTION

In the drawings, like reference numerals throughout refer to the same elements.

Turning initially to FIG. 1, there is shown a barbeque grill 10 of a known configuration which is adaptable for use with the invention. This type of outdoor barbeque grill usable with the invention is also generally shown in my U.S. Pat. Nos. 4,592,335 and 4,882,985, but it will skilled in the art that the present invention is usable with a wide variety of barbeque grill devices and the like.

The barbeque grill 10 is outwardly distinguished by three main components, namely, a firebox 11, legs 12 mounted on wheels for moving the grill 10, and, a covering hood, or lid, 13. In the disclosed embodiment, the hood 13 is of the "bread-box" type as shown in my said Pat. No. 4,882,985, whereby front and rear portions are relatively pivotable to each other to grant access to the firebox 11 primarily from the front and optionally from the back if desired. Inside of the hood 13 and supported at the firebox 11 is an adjustable grill assembly 14 of the invention for cooking food items theron. The invention includes the adjustable grill assembly 14 in combination with a clean out door 15, provided at one end of the firebo in the disclosed form of the invention. The invention, however, is also useful for barbeque grill that do not have covering hoods or lids.

FIG. 2 is an end view of the barbeque grill 10. The hood 13 comprises a front pivoting shell 13' that pivots backward generally over a rear pivotal shell 13" by means of pivots 16 at either end. A cutout gap 17 between the portions 13' and 13" allows for the adjustable grill assembly 14 to extend outwardly thereof at a pair of oppositely extending handle grips 18. The clean out door 15 includes a pair of rotatable draft dampers 19 for opening or closing apertures 20 for controlling the air flow into the firebox 11. A similar draft damper 21 is provided above at the front hood portion 13'. The front hood portion 13' also includes a thermometer 22 communicating interiorly of the grill 10 for monitoring cooking temperatures in a known way. Access to the interior of the hood 13 is provided by lifting handles 23 mounted on the front of the hood shell 13'.

The details of the adjustable grill assembly 14 will be more fully understood with additional reference to FIGS. 3 and 4. The adjustable grill assembly 14 comprises a plurality of longitudinal grill rods 24 for receiving food items to be cooked. They are affixed to a plurality of transverse, thicker cross rods 25 preferably by welding in a known configuration. With reference to FIG. 4, it will be seen that the handles 18 include oppositely pointed L-shaped handlebars 26 that are attached to the cross rods 25 that are closest at each end of the grill rods 24. Peripherally extending around the grill assembly 14 are channels 27 of a standard configuration. The grill rods 24, cross rods 25, handles 18, and channel 27 are made of nickel chrome plated steel. The handlebars 26 terminate at ends 28 thereof attached at the second cross rod 25 from the ends the grill rods 24, noted at "B", which is spaced inwardly from the endmost, or first, cross rod 24 of the adjustable grill assembly 14 shown at the righthand side of FIG. 4 noted at "A". Thereby, the grill assembly 14 may be lifted at the handles 18 located at either end, which are mirror images.

At opposite ends of the second cross rods 25, at "B", and at both ends of the adjustable grill assembly 14, downwardly inclined support legs 29 are weld-engaged at opposite lateral sides and at opposite ends of the cross rods 25. The support legs 29 include upper horizontal portions 30 that are weld engaged to the "B" cross rods 25 at each grill end and therefrom the legs 29 slant downwardly and grill outwardly to terminate in oppositely directed transverse projections 31. Thus, in the disclosed embodiment there are four support legs 29, one each at the four corners of the generally rectangular grill assembly 14. The transverse projections 31 are adjustably supported at grill support plates 32 which reside within the firebox 11 generally at the four corners thereof. The grill support plates 32 have a plurality of slanted notches 33 which open in a direction toward the front of the grill as faced by the chef, or stated another way, toward the side of the grill 10 having the handle 23, as best viewed in FIG. 3. The plurality of notches 33 on each said support panel 32 are located at the same vertical spacings so that the grill rods 24 may be disposed horizontally co-planar at any of a plurality of selected slot elevations. Vertical adjustment is achieved by grasping the handles 18 and lifting the support legs 29 to lift the projections 31 outwardly of one set of notches 33 and thence into notches at a different elevation. It will be seen that the grill support plates 32 at the front of the grill 10, i.e. the right hand side of FIG. 3, provides a spacing 34 between the support plate 32 and the front wall of the firebox, denoted at 35, to allow for the movement of the support legs 29 outwardly of the notches, thence upwardly or downwardly to the next selected notches 33.

The grill support plates 32 are preferably weld-engaged to the bottom wall of the firebox 11. It will be further observed that there is a capability for slant adjusting the grill assembly 14 by, for example, maintaining the projections 31 of the support legs 29 at the front side of the grill 10, adjacent the firebox wall 35, at a different location than the projections 31 of the rear support legs 29. This provides a front to back slanting. Additionally, at opposite ends, the projections 31 of the support legs 29 at the lefthand end may be disposed at different elevations than at the righthand end, so that when facing the grill 10 as in the elevational view of FIG. 1, the grill assembly 14 may slant downwardly or upwardly from left to right as needed. This slant adjustment allows for placing foods at different temperature gradients above the heat source atop the grill rods 24. This is useful when different types of vegetables or meats are being cooked, and when some are being just kept warm while others are still cooking.

The adjustment of the assembly 14 by means of lifting at the handles 18 can be achieved without opening the hood 13 by virtue of the gaps 17 allowing for the handlebars 26 to move upwardly and downwardly therein. It will be understood that the hood 13 may be of a single shell type wherein the gap 17 would be made though a one-piece hood end wall and there would be no relative pivotability of two shell-like portions as in portions 13' and 13". The gap 17 preferably accommodates the vertical movement of the handlebars 26 therein to permit the grill assembly 14 to move from the highest to lowest positioning of the support legs 29 on the notches 33 of the grill support plates 32.

In accordance with the invention, the end walls of the firebox 11 are not required to be supportively associated with the grill support plates 32 as in my said Pat. No. 4,592,335. This feature allows for the provision of clean out door 15 to be closed and opened without disturbing the grill assembly 14 while the food is being cooked and the hood 13 remains closed atop the firebox 11. Particularly, with regard to FIGS. 2 and 5 it will be seen that the clean out door 15 extends for the full width of the firebox 11 and includes an upper lip flange 36 that, when in the closed position, is co-planar with a hood-supporting peripheral flange 37 of the walls of the firebox 11. Along with flange 37, lip flange 36 also helps support the hood 13 when the door is up, i.e. closed, as depicted in FIG. 2. From the upper lip flange 36 a depending wall 38 extends vertically downwardly to close across the end of the firebox 11. As is shown at FIG. 2, the wall 38 includes thereon the draft dampers 19. Extending from the wall 38, toward the firebox for overlying disposition along the outside of the long walls of the firebox are flanges 39 which are mechanically attached to the firebox 11 by means of removable nut and bolt assemblies 40. The nut and bolt assemblies 40 removably lock the clean out door 15 in place during cooking procedures. They are quickly unfastened with a wrench to unlock the clean out door 15 and thereby grant access to the interior of the firebox 11 The clean out door 15 is pivotally mounted to the firebox 11 by the provision of a lower extending flap 41 extending toward the firebox from the vertical wall 38 and underneath the bottom of the firebox 11, as best viewed in FIG. 5. The flap 41 terminates at a piano hinge 42 that runs for the full width of the vertical wall 38 so to provide a continuous hinge engagement of the clean out door 15 to the firebox 11. In FIG. 5, the clean out door 15 is shown in solid lines in the closed position and in dashed lines in the pivoted downward, or open, position for the clean out of the interior of the firebox 11.

Further considering FIG. 5 in conjunction with FIG. 3, the firebox 11 includes therein a conventional fire grate 33 for supporting charcoal, wood, or other combustible material used for cooking. Thus, when pivoting the clean out door 15 to the position shown in dashed lines in FIG. 5, access to the fire grate 43 is provided to remove ashes, burnt food particles, and the like, therefrom while the adjustable grill assembly 14 is maintained in place. Additional amounts of charcoal, wood, etc., may also be placed on the grate 43 in this way, or otherwise may be re-arranged or stirred. The fire grate 43 further includes longitudinal support rods 44 running the length thereof. The fire grate 43 is supported at the firebox long front wall 35 and long back wall 45 by angle brackets 46 mounted along the front and back long walls. The fire grate 43 extends between the pairs of grill support plates 32 at opposite ends of the firebox 11, but alternately might be notched around the plates 32 and extend for substantially the full length of the firebox 11. The clean out door 15 is further provided with tabs 47 for facilitating grasping the door 15 to pull it downwardly or push it upwardly as needed. It will be further seen that the piano hinge 42 includes a hinge leaf 48 welded to the bottom of the firebox 11 to form a fixed leaf of the hinge 42 wherein the other hinge leaf is the movable leaf and comprises the flap 41 described above.

In an alternate embodiment, the firebox draft dampers 20 might be eliminated from the clean out door 15 and placed only at an opposite firebox fixed end wall 49, shown at the righthand side in FIG. 1. Of course, for a gas fired grill, the fire grate 43 would be replaced by burners and the vents might be eliminated from the firebox entirely. Moreover, the clean out door 15 can be provided with only one draft damper, more than two, or none at all, as needed for a particular grill configuration.

In yet another embodiment, a clean out door 15 might also be provided at the opposite firebox end instead of the fixed wall 49 shown. Therefore, the inventive clean out door 15 may be provided at either or both ends of a barbeque grill firebo.

The foregoing provides a detailed description of but one embodiment of the invention. It will therefore be apparent to those skilled in the art that many equivalents fall within the broad scope of the claims appended hereto.

What is claimed is:

1. In a barbeque grill of the type having a firebox with wall means having upper peripheral portions, means for heating food, and a grill means for the placement of food to be cooked,
   a clean out means comprising:
   a door means at one end of said firebox;
   mechanical fastening means for fastening said door means to the firebox;
   said door means having an upper portion substantially co-planar with the upper peripheral portions of the firebox wall means; and,
   hinge means along the door means at the bottom thereof for pivoting open and closed said door means to permit access to the interior of the firebox.

2. The clean out means as claimed in claim 1 wherein the door means includes flange means extending along outer portions of the firebox wall means.

3. The clean out means as claimed in claim 2 wherein the mechanical fastening means removably fasten said flange means to the firebox wall means.

4. The clean out means as claimed in claim 1 wherein the hinge means comprises a piano hinge.

5. The clean out means as claimed in claim 4 wherein the piano hinge means comprises a first leaf extending from said door means pivotally joined by a piano hinge to a second hinge leaf affixed to the underside of a bottom wall of said firebox and extending for substantially the full width of said firebox.

6. The clean out means as claimed in claim 1 wherein said door means is provided at opposite ends of said firebox.

7. The clean out means as claimed in claim 1 wherein said door means further includes draft damper means.

8. The barbeque grill as claimed in claim 1 wherein said grill means is an adjustable grill assembly comprising a food placement grill portion supported by a grill support means, the grill portion comprising a series of food supporting grill rods mounted on transverse cross rods and handlebar means extending longitudinally at opposite ends of the grill portion, the grill support means including depending leg means depending from said grill portion and having lower support projections, support plates at opposite ends of said firebox having a plurality of notches for supportive receipt of said lower support projections at any said notch, and wherein said grill portion of the adjustable grill assembly is adjustable upwardly and downwardly by moving the handlebar means to change the supportive receipt of said lower support projections among said notches.

9. The barbeque grill as claimed in claim 8, wherein said grill support plate notches are upwardly inclined notches.

10. The barbeque grill as claimed in claim 9 wherein the support plates are located within the firebox and spaced inwardly from opposing end walls of said wall means thereof whereby to provide for the adjustment of said grill portion independently of the pivotal opening and closing of the door means.

11. A barbeque grill having:
    a firebox with means for providing a heat source for cooking;
    a grill means for placing food thereon;
    leg support means for the firebox;
    said grill means being an adjustable assembly comprising:
    grill rods arranged longitudinally of the firebox and supportively attached by transverse cross rods;
    handle means extending longitudinally outward from the grill rods at opposite ends thereof, said grill rods defining a generally rectangular grilling surface;
    depending support legs extending downwardly from the cross rods generally below all four corners or the rectangular grilling surface and wherein at lower ends thereof said support legs have projections;
    grill support means arranged within said firebox generally at the four corners of the firebox and supportively engageable with said support leg projections, said grill support means being spaced inward from opposite walls of said firebox, and said grill support means each having a multiplicity of projection-engageable means for adjustable supportive engagement with a leg projection at any one thereof.

12. The barbeque grill as claimed in claim 11, wherein said grill support means comprise plates and said projection engageable means are a plurality of upwardly slanting notches.

13. The barbeque grill claimed in claim 11, wherein said Barbeque Grill has a closeable hood wherein said adjustable grill assembly handle means extend outward of the closable hood through gap means at opposite ends of the closable hood.

14. The barbeque grill as claimed in claim 13, wherein said closable hood comprises two relatively pivotal shell portions.

15. The barbeque grill as claimed in claim 11, wherein at one end of said firebox said firebox includes a pivotal clean out door means, said grill support means spaced from said clean out door means, and the clean out door means being movable from a closed to open position for cleaning out ash and the like from the firebox independently of adjustment of the support leg projections at said grill support means.

16. The barbeque grill as claimed in claim 15, wherein said clean out door means is pivotally engaged to the firebox at hinge means and includes mechanical fastener means releasably fastening the clean out door means to the firebox.

17. The barbeque grill as claimed in claim 16, wherein said hinge means comprises a continuous piano hinge pivotally joining the clean out door means to a bottom wall of said firebox.

18. A barbeque grill including firebox clean out door means capable of being opened and closed during cooking, and an adjustable grill assembly, said adjustable grill assembly being adjustable independently of the opening and closing of the clean out door means, said clean out door means comprising:

wall portion extending across one end of the firebox, flange means extending from the wall portion along the firebox, removable mechanical fastener means removably fastening the flange means to the firebox, said wall portion joined to a hinge means extending across the firebox generally at the underside thereof, whereby upon unfastening the mechanical fastener means said clean out door means may be pivoted downwardly to grant access to the interior of the firebox independently of said adjustable grill assembly.

19. The barbeque grill as claimed in claim 18 wherein the removable mechanical fastener means fasten said flange means at opposite ends of the wall portion to said firebox.

20. The barbéque grill as claimed in claim 18 wherein said hinge means comprises a piano hinge having one hinge leaf thereof affixed at the underside of the firebox and joining a second movably hinged leaf joined to said wall portion of the clean out door means.

21. The barbeque grill as claimed in claim 18 wherien the barbeque grill includes a closeable cover means.

* * * * *